Patented Aug. 26, 1924.

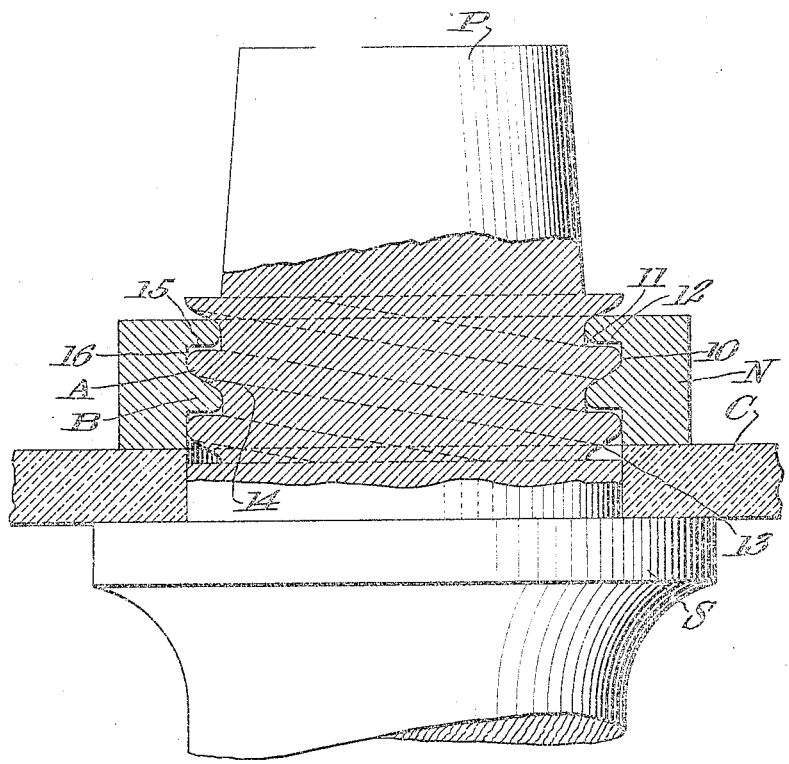

1,506,403

UNITED STATES PATENT OFFICE.

HARRY J. BAKER, OF INDIANAPOLIS, INDIANA, ASSIGNOR TO THE PREST-O-LITE COMPANY, INC., A CORPORATION OF NEW YORK.

STORAGE BATTERY.

Application filed March 26, 1923. Serial No. 328,356.

*To all whom it may concern:*

Be it known that I, HARRY J. BAKER, a citizen of the United States, residing at Indianapolis, in the county of Marion and State of Indiana, have invented certain new and useful Improvements in Storage Batteries, of which the following is a specification.

This invention relates to storage batteries and particularly to improved means for securing a terminal post to a cell cover.

The type of threaded nut heretofore used for this purpose has had a V-shape thread cooperating with a similar thread on the terminal post. When such nuts are tightened there is a tendency for the interfitting threads of the nut and post, which are usually of leaden alloy, to freeze together, to loosen which may require destruction of the nut or post or both.

Accordingly, the principal objects of this invention are to eliminate such freezing of the nut to the post and provide a securing means in which the nut may be repeatedly tightened and loosened without damage to the threads of either the nut or post. Broadly speaking, these objects are attained by forming the cooperating threads so that the lower surface of the nut thread does not engage the upper surface of the post thread and so that there will be contact only between the upper surface of the nut thread and the lower surface of the post thread and also at the roots of the threads.

The above and other objects and the novel features of this invention will be apparent from the following description taken with the accompanying drawing, which is an enlarged view partly in section, illustrating a threaded securing means embodying this invention.

Referring to the drawing, P is a threaded terminal post that is united to a strap S which connects together a group of cell plates or electrodes of like polarity. The post P projects through an opening in a cell cover C, and is threaded as at A, the apex of each thread desirably being rounded as at 10 and a helical surface 11 coaxial with the post forms the root of the thread. The upper side 12 of the thread A may be substantially perpendicular to the root surface 11, whereas the lower surface 13 of the thread is inclined inwardly and downwardly toward the base of the post P.

The internal thread B of the nut N is similar but reversed to the thread on the post, that is, the upper surface 14 of the nut thread is inclined and its lower surface 15 is perpendicular to the root surface 16.

The post and nut are of acid-resistant conductive material, such as a leaden alloy, usually an alloy of lead and antimony. In use, the nut is placed on the post and, when tightly drawn up as shown, the inclined upper surface 14 of the nut thread and the correspondingly inclined lower surface 13 of the post thread abut against and slide along one another, the roots of the respective threads being in contact with the apexes of the cooperating threads. By forming the threads so that the lower surface 15 of the nut thread does not engage the upper surface 12 of the post thread, and so that the contact is obtained only between the upper surface of the nut thread and the lower surface of the post thread, and at the roots of the threads, freezing will be substantially eliminated, regardless of the pitch of the threads, and the nut may be repeatedly tightened and loosened in assembling or dismantling the cover without damaging either of the threads.

I claim:

1. In a storage battery, the combination of a cell cover having an opening therethrough, a threaded leaden terminal post projecting through such opening, and a threaded leaden nut for securing said post in said opening, the nut and terminal post when coupled together in operative relation having contact only between the upper surface of the nut thread and the lower surface of the post thread and at the roots of said threads.

2. In a storage battery, the combination of a cell cover having an opening therethrough; a threaded leaden terminal post projecting through said opening, the thread of said post comprising a helical surface forming the root thereof, a surface perpendicular to said helical surface constituting the upper face of said post thread, and a surface inclined inwardly and downwardly toward the base of said post constituting the lower surface of said post thread; and a threaded leaden nut for securing said post in said opening, the thread of said nut comprising a helical surface forming the root thereof, a surface perpendicular to the last mentioned helical surface constituting the lower face of said nut thread, and a surface inclined to the last mentioned helical surface constituting the upper surface of said nut thread; the construction being such that said nut and post when in clamping relation shall have contact only between the upper surface of the nut thread and the lower surface of the post thread and at the roots of said threads.

In testimony whereof, I affix my signature.

HARRY J. BAKER